(12) United States Patent
Wang

(10) Patent No.: US 12,434,757 B1
(45) Date of Patent: Oct. 7, 2025

(54) VEHICLE STEERING COLUMN, CONTROL METHOD THEREOF, AND VEHICLE

(71) Applicant: HL Mando Corporation, Pyeongtaek-si (KR)

(72) Inventor: Shiyun Wang, Suzhou (CN)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/801,986

(22) Filed: Aug. 13, 2024

(30) Foreign Application Priority Data

Apr. 3, 2024 (CN) .......................... 202410399690.6

(51) Int. Cl.
*B62D 1/185* (2006.01)
*B62D 1/187* (2006.01)

(52) U.S. Cl.
CPC ............. *B62D 1/185* (2013.01); *B62D 1/187* (2013.01)

(58) Field of Classification Search
CPC ................................ B62D 1/185; B62D 1/187
See application file for complete search history.

(56) References Cited

U.S. PATENT DOCUMENTS

| | | | | |
|---|---|---|---|---|
| 2019/0210633 A1* | 7/2019 | Derocher | ............... | B62D 1/181 |
| 2022/0161841 A1* | 5/2022 | Kreutz | .................... | B62D 1/181 |
| 2022/0324505 A1* | 10/2022 | Ku | ........... | B62D 1/187 |
| 2023/0043788 A1* | 2/2023 | Ponikiewski | .......... | B62D 1/185 |
| 2023/0126450 A1* | 4/2023 | Tinnin | ................... | B62D 1/181 |
| | | | | 74/493 |

FOREIGN PATENT DOCUMENTS

| | | | | | |
|---|---|---|---|---|---|
| CN | 108367771 | A * | 8/2018 | ............ | B62D 1/181 |
| DE | 102018211041 | A1 * | 1/2020 | ............ | B62D 1/181 |
| DE | 102019201390 | A1 * | 8/2020 | ............ | B62D 1/181 |
| EP | 2808225 | A1 * | 12/2014 | ............ | B62D 1/181 |
| KR | 100814759 | B1 * | 3/2008 | | |
| WO | WO-2020007723 | A1 * | 1/2020 | ............ | B62D 1/181 |
| WO | WO-2022002886 | A1 * | 1/2022 | ............ | B62D 1/181 |

* cited by examiner

*Primary Examiner* — Drew J Brown
(74) *Attorney, Agent, or Firm* — Hauptman Ham, LLP

(57) ABSTRACT

A vehicle steering column includes an upper tubular column connected to a steering wheel, a middle tubular column into which the upper tubular column is slidably inserted, a lower tubular column into which the middle tubular column is slidably inserted, the lower tubular column being connected to a vehicle body, and a telescoping device connected to the upper tubular column, the middle tubular column, and the lower tubular column to retract or expand the three tubular columns.

19 Claims, 8 Drawing Sheets

VEHICLE STEERING COLUMN, CONTROL METHOD THEREOF, AND VEHICLE

CROSS-REFERENCE TO RELATED APPLICATIONS

This application claims benefit and priority to Chinese Patent Application No. 202410399690.6, filed on Apr. 3, 2024, with the China National Intellectual Property Administration, the disclosure of which is incorporated herein in its entirety by reference.

TECHNICAL FIELD

The present disclosure relates to a vehicle steering column, a control method thereof, and a vehicle equipped with the vehicle steering column.

BACKGROUND

A steering column assembly for a vehicle is a part that connects a steering wheel and a steering mechanism and is an important part for transmitting torque. The steering wheel is connected to the steering mechanism through a steering column, a universal joint, an intermediate shaft, and an output shaft. As the steering mechanism is driven through operation of the steering wheel, wheels connected to the steering mechanism swing left and right to achieve steering of the vehicle.

In general, a vehicle steering column has a telescoping function, and drivers can adjust the degree of protrusion of the steering wheel to suit their height and body shape. The existing vehicle steering column includes an upper tubular column and a lower tubular column. The upper tubular column is slidably inserted into the lower tubular column, and the lower tubular column is fixed to the vehicle body using a mounting bracket. A steering wheel is connected to the upper tubular column.

Expansion/contraction of the upper tubular column with respect to the lower tubular column is achieved within a defined length range according to control of an actuator. That is, the degree of protrusion of the steering wheel is adjusted through control of the actuator. The existing vehicle steering column adopts a two-stage column overlap method as described above, and expands/contracts only within a range of about ±30 mm.

Recently, autonomous vehicles that can automatically arrive at their destinations without drivers having to operate steering wheels, accelerator pedals, and brakes have been being developed. The driving mode of autonomous vehicles includes a driver driving mode in which a driver directly drives a vehicle and an autonomous driving mode in which a vehicle travels automatically based on an autonomous driving system.

In the autonomous driving mode, it is possible to provide great spatial convenience to the driver by retracting the steering wheel located in front of the driver into the vehicle body. Since a vehicle travels in the driver driving mode or the autonomous driving mode, the steering wheel can be operated by a driver as in a regular vehicle in the driver driving mode, and the steering wheel can be retracted into the vehicle body in the autonomous driving mode.

As described above, the existing vehicle steering column can only expand/contract by about ±30 mm in the upper tubular column, and thus the amount of expansion/contraction is significantly smaller than the size of the steering wheel, making it difficult to hide the steering wheel in the vehicle body. Therefore, it is a problem that needs to be urgently solved to implement a vehicle steering column having a large amount of expansion/contraction such that the steering wheel can be properly retracted into the vehicle body.

SUMMARY

The present disclosure has been devised to solve the above-described conventional problems, and an object of the present disclosure is to provide a vehicle steering column for effectively hiding a steering wheel in a vehicle body with a large amount of expansion/contraction, a control method thereof, and a vehicle.

To achieve the aforementioned object, a vehicle steering column according to the present disclosure includes an upper tubular column connected to a steering wheel, a middle tubular column into which the upper tubular column is slidably inserted, a lower tubular column into which the middle tubular column is slidably inserted, the lower tubular column being connected to a vehicle body, and a telescoping device connected to the upper tubular column, the middle tubular column, and the lower tubular column to overlap or unfold the three tubular columns.

The upper tubular column and the middle tubular column may be simultaneously slid by operation of the telescoping device in a state in which the lower tubular column is stopped. A moving speed of the upper tubular column is higher than a moving speed of the middle tubular column, and a displacement of the upper tubular column may be greater than a displacement of the middle tubular column.

The telescoping device may include a driving motor fixed to the lower tubular column, a lead screw connected to an output shaft of the driving motor, a first lead screw nut engaged with the lead screw and connected to the upper tubular column, and a second lead screw nut engaged with the lead screw and connected to the middle tubular column.

The lead screw may include a first lead screw part and a second lead screw part, the first lead screw part may be matched with the first lead screw nut, and the second lead screw part may be matched with the second lead screw nut.

A screw lead of the first lead screw part may be larger than a screw lead of the second lead screw part.

The number of threads of the first lead screw part moving per rotation of the lead screw may be greater than the number of threads of the second lead screw part moving per rotation of the lead screw.

The outer diameter of the first lead screw part may be greater than the outer diameter of the second lead screw part, and the first lead screw nut may be a long cylindrical nut.

The first lead screw part and the second lead screw part may have separate structures, and one end of the first lead screw part in the longitudinal direction and one end of the second lead screw part in the longitudinal direction may be connected using a pin.

The vehicle steering column according to the present disclosure may further include a stop member mounted on the lower tubular column and the middle tubular column to secure the middle tubular column to the lower tubular column and to secure the upper tubular column to the middle tubular column.

The stop member may include a stop bolt, a disc spring, and a bushing sequentially connected and may be mounted in long holes formed in the lower tubular column and the middle tubular column.

The bushing may be in close contact with the outer circumferential surfaces of the middle tubular column and the upper tubular column.

A contact surface of the bushing in close contact with another tubular column inserted into a tubular column may be formed as a curved surface matching the curvature of the outer circumferential surface of the other tubular column.

The vehicle steering column according to the present disclosure may further include a tilting adjustment device mounted on the vehicle body and the lower tubular column to adjust tilting of the lower tubular column.

The tilting adjustment device may include a motor, a tilting adjustment lead screw, a lead screw nut, a connection bracket, and an adjustment rotation shaft.

The motor may be connected to the center of the outer surface of the lower tubular column. The connection bracket may be rotatably connected to one end of the outer wall of the lower tubular column closer to the upper tubular column. The adjustment rotation shaft may be connected to an end of the outer wall of the lower tubular column away from the upper tubular column and rotatably mounted on the vehicle body. An axis of the adjustment rotation shaft may be perpendicular to an axis of the lower tubular column. An output shaft of the motor may be connected to one end of the tilting adjustment lead screw. The other end of the tilting adjustment lead screw may be connected to one end of the lead screw nut. The other end of the lead screw nut may be relatively rotatably connected to the connection bracket. The connection bracket may be rotatably connected to the lower tubular column.

A method of controlling a vehicle steering column according to the present disclosure includes controlling operation of a telescoping device such that, in the vehicle steering column in which three tubular columns overlap in three stages, the three tubular columns overlap or unfold to variably adjust a length of the vehicle steering column. Here, a moving speed and a displacement of the upper tubular column may be controlled to be greater than a moving speed and a displacement amount of the middle tubular column.

A vehicle according to the present disclosure includes a steering wheel, and a vehicle steering column connected to the steering wheel and a vehicle body and including three tubular columns overlapping in three stages, the three tubular columns overlapping or unfolding using a telescoping device to vary an overall length of the steering column.

According to the vehicle steering column, control method thereof, and vehicle according to the present disclosure, an expansion/contraction structure in which three tubular columns are connected and the length thereof is varied in a manner of overlapping or unfolding while sliding relative to each other is applied to increase a total amount of expansion/contraction of the steering column, compared to the prior art, and thus the steering wheel can be effectively retracted into the vehicle body. In particular, the amount of contraction displacement that shortens the length of the vehicle steering column increases, allowing the steering wheel to be effectively hidden in the vehicle body.

DETAILED DESCRIPTION

Hereinafter, a vehicle steering column, a control method thereof, and a vehicle according to the present disclosure will be described in detail with reference to the attached drawings. Here, the control method of the vehicle steering column and the vehicle will not be described separately, and description thereof will be included in the description of the vehicle steering column.

Figure 1:
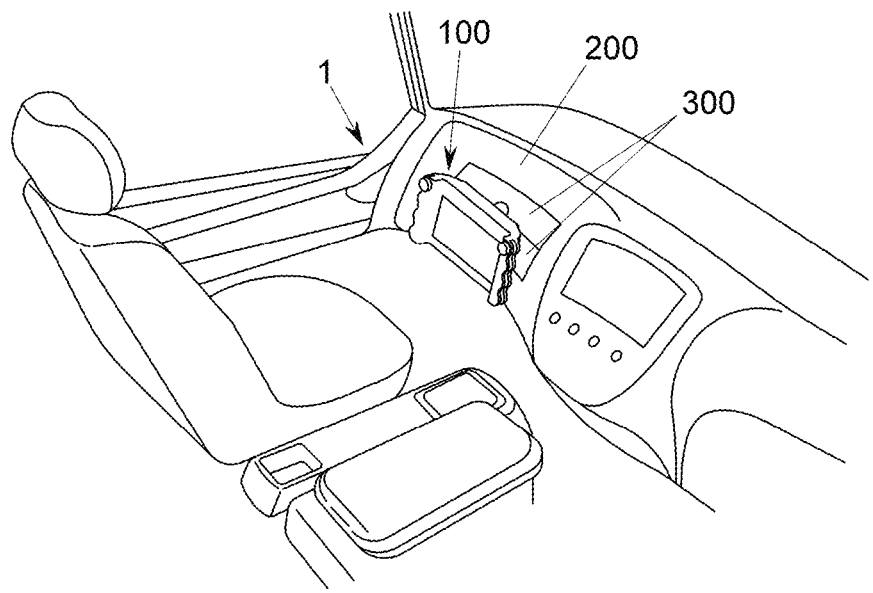
FIG. 1 and FIG. 2 are diagrams illustrating a vehicle to which a vehicle steering column according to the present disclosure is applied.
Figure 2:
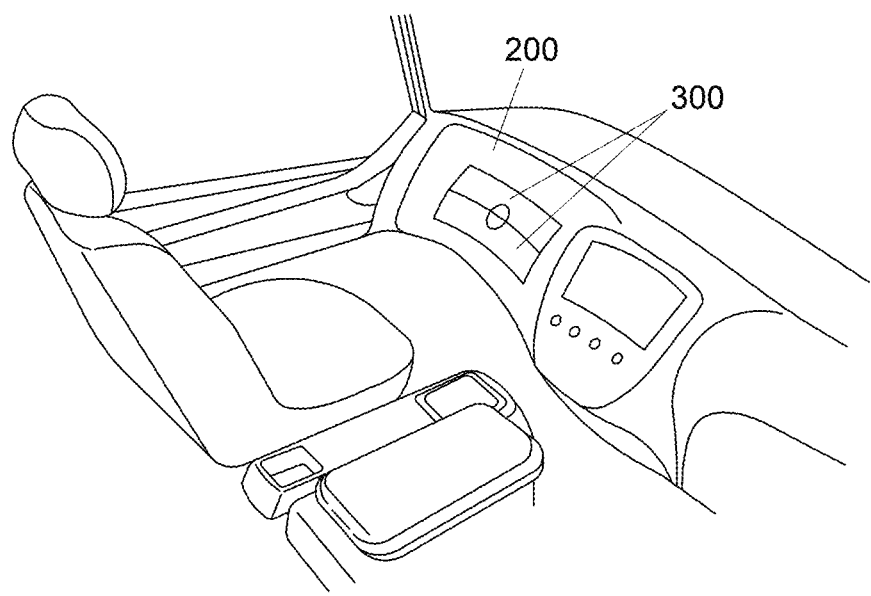

As described above, the driving mode of an autonomous vehicle includes a driver driving mode in which a driver directly drives the vehicle and an autonomous driving mode in which the vehicle travels automatically based on an autonomous driving system. In the driver driving mode, as illustrated in FIG. 1, a steering wheel 100 protrudes from a dashboard 200 such that the driver can directly control driving of the vehicle 1. In the autonomous driving mode, the steering wheel 100 is retracted into the dashboard 200, as illustrated in FIG. 2. Protrusion and retraction of the steering wheel 100 can be adjusted by operating the vehicle steering column according to the present disclosure. Meanwhile, the dashboard 200 is provided with a cover 300 and thus can be closed when the steering wheel 100 is retracted into the dashboard 200 to prevent the steering wheel 100 from being exposed. For reference, the vehicle steering column according to the present disclosure is installed in the vehicle body such that the vehicle steering column is not exposed to the outside and has a tilting adjustment function in addition to the above-described function of controlling protrusion and retraction of the steering wheel 100.

As illustrated in FIG. 3 to FIG. 6, the vehicle steering column according to an embodiment of the present disclosure includes an upper tubular column 1000, a middle tubular column 2000, a lower tubular column 3000, and a telescoping device 4000.

One end of the upper tubular column 1000 is connected to a steering wheel through a steering shaft L, and a column surface of the lower tubular column 3000 is connected to the vehicle body through a mounting bracket T. The upper tubular column 1000 is inserted into the middle tubular column 2000 and is slidably connected to the middle tubular column 2000. The middle tubular column 2000 is inserted into the lower tubular column 3000 and is slidably connected to the lower tubular column 3000. Meanwhile, although not illustrated, the upper tubular column 1000 may be slidably inserted into the lower tubular column 3000 with the middle tubular column 2000 slidably inserted into the upper tubular column 1000. As a method of connecting the upper tubular column 1000, the middle tubular column 2000, and the lower tubular column 3000, both of the above two connection methods can be applied.

Figure 10:
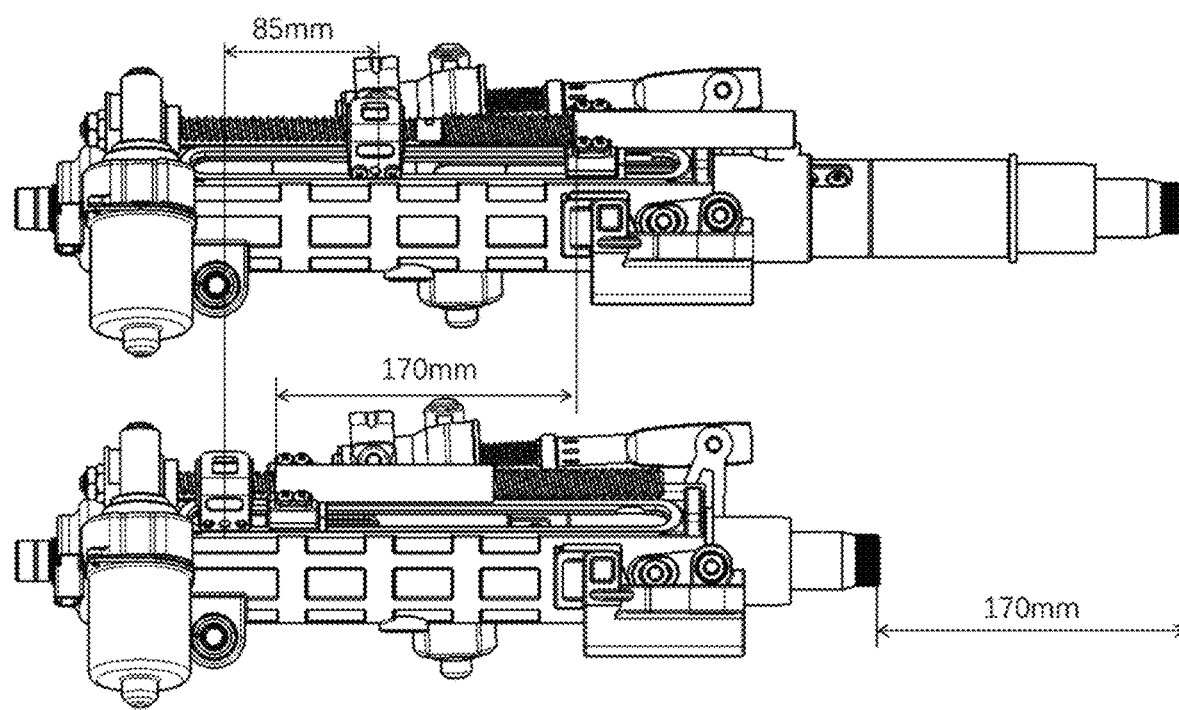
FIG. 10 is a diagram illustrating the amount of expansion/contraction of the vehicle steering column according to the present disclosure.

The vehicle steering column according to the present disclosure has a telescoping structure in which three tubular columns are connected and relatively slide to vary the length, and thus the total amount of expansion/contraction of the vehicle steering column can be increased compared to the prior art. For example, the vehicle steering column according to the present disclosure can achieve an expansion displacement of about 30 mm and a contraction displacement of about 170 mm (refer to FIG. 10). In this manner, the vehicle steering column according to the present disclosure can have a contraction displacement of about 170 mm, which is significantly larger than 30 mm that is the contraction displacement of the existing vehicle steering column, and thus it is possible to meet the demand to hide the steering wheel in the vehicle body.

Of course, the amounts of expansion and contraction of the vehicle steering column according to the present disclosure are not limited to the aforementioned values, and may be changed to different sizes when the sizes of the upper tubular column 1000, the middle tubular column 2000, and the lower tubular column 3000 are changed. For reference, in a case where the total length of the existing steering column (two-stage tubular column) including the upper tubular column and the lower tubular column is the same as the total length of the steering column (three-stage tubular column) including the upper tubular column, the middle tubular column, and the lower tubular column in the fully expanded state, the contraction displacement of the three-stage tubular column is greater than the contraction displacement of the two-stage tubular column.

A three-step connection method of inserting the upper tubular column 1000 into the middle tubular column 2000 and the middle tubular column 2000 into the lower tubular column 3000 will be further described below.

Figure 6:
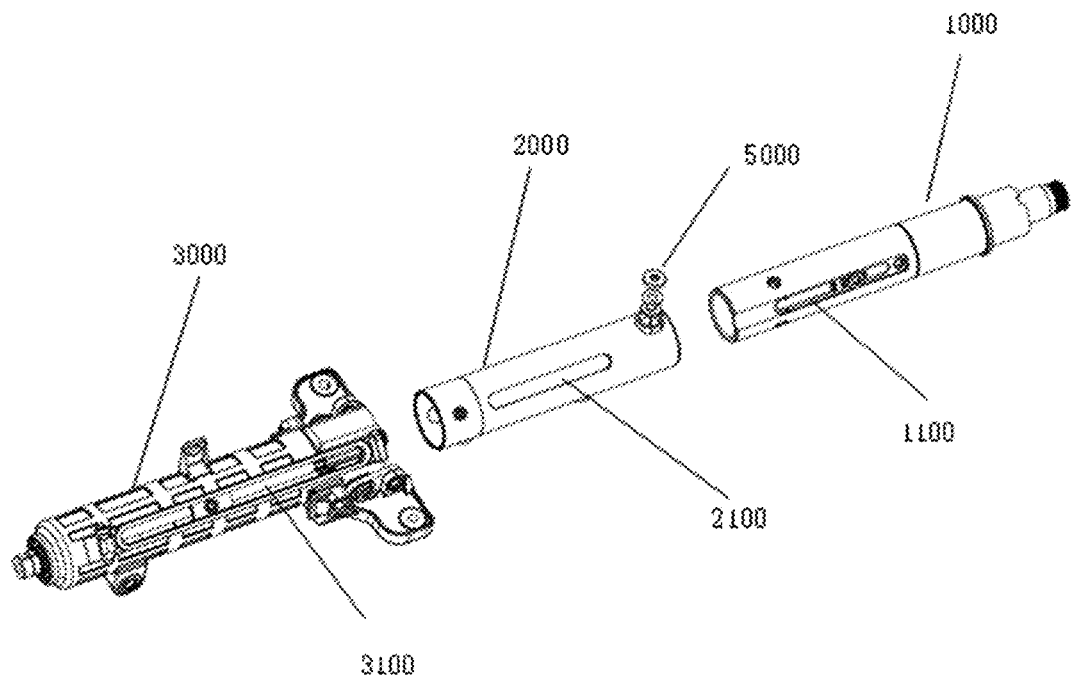
FIG. 6 is an exploded perspective view of an upper tubular column, a middle tubular column, and a lower tubular column shown in FIG. 5.

As illustrated in FIG. 6, the upper tubular column 1000 is formed in a hollow cylindrical shape. One end of the upper tubular column 1000 is connected to the steering shaft L and may be closed or open. The other end of the upper tubular column 1000 is open. An upper tubular column long hole 1100 is formed in the circumferential wall of the upper tubular column 1000 in the longitudinal direction.

The middle tubular column 2000 is formed in a hollow cylindrical shape with both ends open. A middle tubular column long hole 2100 is formed in the circumferential wall of the middle tubular column 2000 in the longitudinal direction. The upper tubular column 1000 is inserted into the middle tubular column 2000, and the upper tubular column long hole 1100 and the middle tubular column long hole 2100 may overlap in whole or in part.

The lower tubular column 3000 is formed in a hollow cylindrical shape. One end of the lower tubular column 3000 is connected to the steering output shaft and may be closed or open. The other end of the lower tubular column 3000 is open. A lower tubular column long hole 3100 is formed in the circumferential wall of the lower tubular column 3000 in the longitudinal direction. The middle tubular column 2000 is inserted into the lower tubular column 3000, and the upper tubular column long hole 1100, the middle tubular column long hole 2100, and the lower tubular column long hole 3100 may overlap in whole or in part.

The tubular column including the upper tubular column 1000, the middle tubular column 2000 and the lower tubular column 3000 is connected to the telescoping device 4000. While the lower tubular column 3000 is stopped, the upper tubular column 1000 and the middle tubular column 2000 slide simultaneously by operation of the telescoping device 4000. As described above, the length of the tubular columns decreases in a direction in which the three tubular columns overlap and increases in a direction in which the three tubular columns are unfolded.

Figure 3:
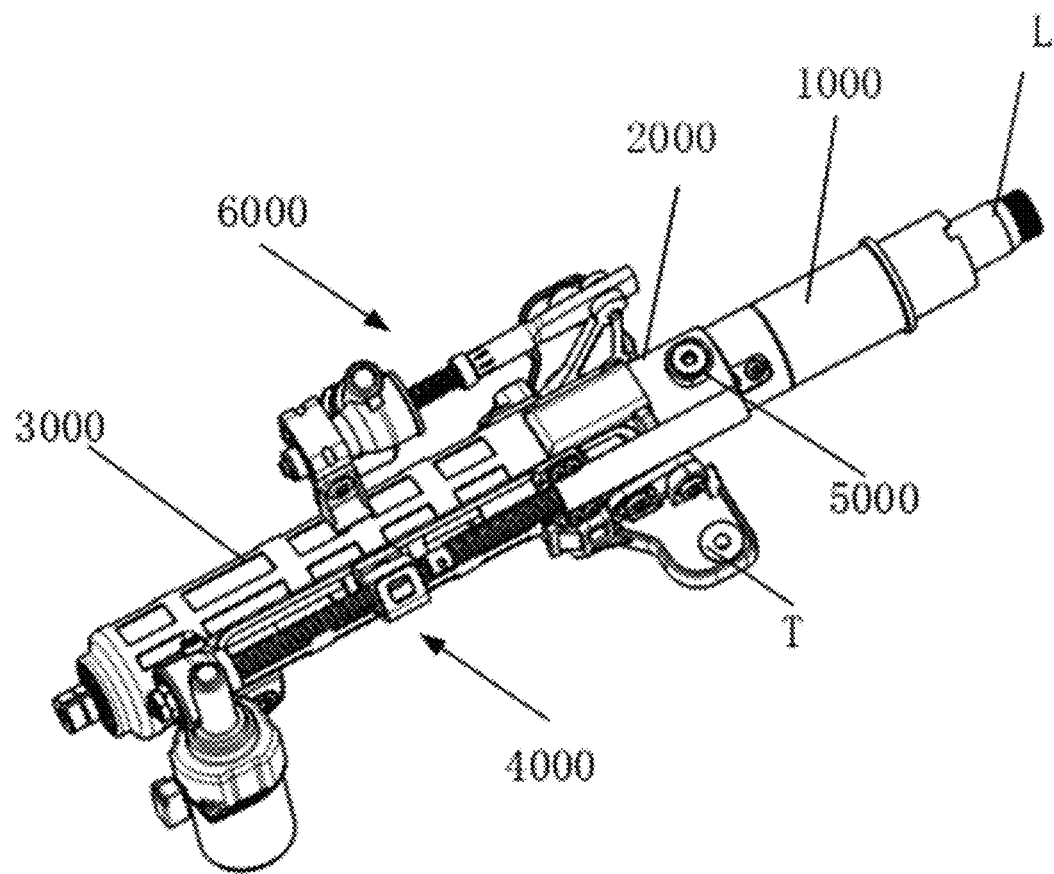
FIG. 3 is a first exemplary perspective view of the vehicle steering column according to the present disclosure.
Figure 5:
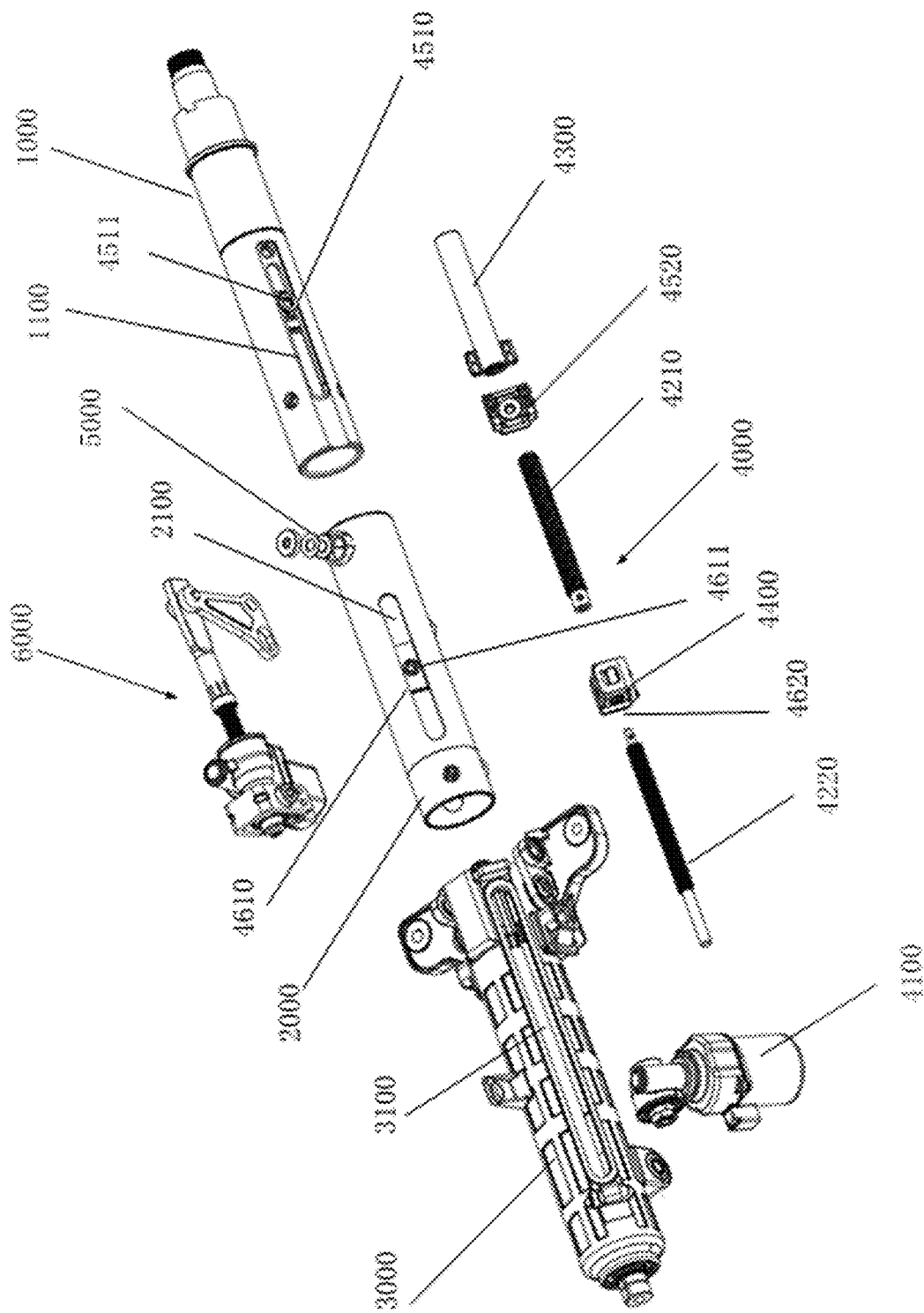
FIG. 5 is an exploded perspective view of the vehicle steering column according to the present disclosure.
Figure 7:
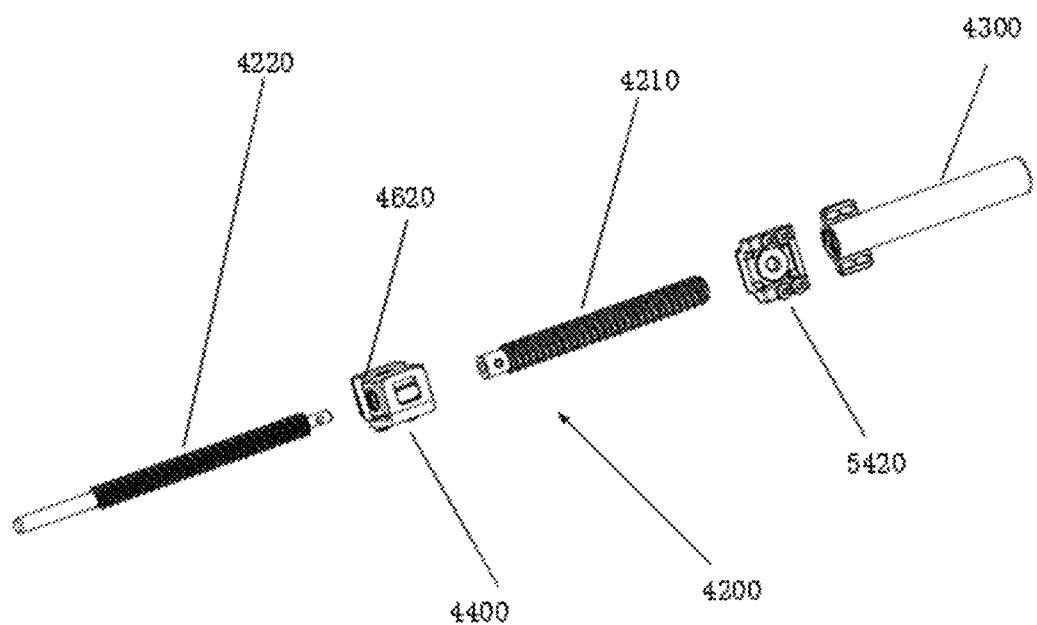
FIG. 7 is an exploded perspective view of a first lead screw part, a second lead screw part, a first lead screw nut, and a second lead screw nut shown in FIG. 5.

As shown in FIG. 3, FIG. 5, and FIG. 7, the telescoping device 4000 includes a driving motor 4100, a lead screw 4200, a first lead screw nut 4300, and a second lead screw nut 4400. The output shaft of the driving motor 4100 is connected to the lead screw 4200 and rotates the lead screw 4200. The first lead screw nut 4300 and the second lead screw nut 4400 are mounted on the lead screw 4200. The first lead screw nut 4300 is connected to the upper tubular column 1000, and the second lead screw nut 4400 is connected to the middle tubular column 2000.

As shown in FIG. 5 and FIG. 7, the lead screw 4200 includes a first lead screw part 4210 and a second lead screw part 4220. The first lead screw part 4210 is matched with the first lead screw nut 4300, and the second lead screw part 4220 is matched with the second lead screw nut 4400. The first lead screw nut 4300 is connected to the upper tubular column 1000 through a first support assembly, and the second lead screw nut 4400 is connected to the middle tubular column 2000 through a second support assembly.

Specifically, as illustrated in FIG. 5, the first support assembly includes an upper tubular column connection member 4510 and a first lead screw nut connection member 4520. The upper tubular column connection member 4510 may be fixed to the inner wall of the upper tubular column 1000 at the upper tubular column long hole 1100 through welding or riveting. A connection portion 4511 of the upper tubular column connection member 4510 is exposed from the upper tubular column long hole 1100. The first lead screw nut connection member 4520 may be fixed to the first lead screw nut 4300 through, for example, bolts or welding, or may be formed integrally with the first lead screw nut 4300. The upper tubular column connection member 4510 and the first lead screw nut connection member 4520 may be connected by a screw connection method. Through this connection, the first lead screw nut 4300 can be connected to the upper tubular column 1000.

As illustrated in FIG. 5, the second support assembly includes a middle tubular column connection member 4610 and a second lead screw nut connection member 4620. The middle tubular column connection member 4610 may be fixed to the inner wall of the middle tubular column 2000 at the middle tubular column long hole 2100 through welding or riveting. A connection portion 4611 of the middle tubular column connection member 4610 is exposed from the middle tubular column long hole 2100. The second lead screw nut connection member 4620 may be fixed to the second lead screw nut 4400 through, for example, bolts or welding, or may be formed integrally with the second lead screw nut 4400. The middle tubular column connection member 4610 and the second lead screw nut connection member 4620 may be connected by a screw connection method. Through this connection, the second lead screw nut 4400 can be connected to the middle tubular column 2000.

As illustrated in FIG. 5, the first lead screw part 4210 and the second lead screw part 4220 of the lead screw 4200 have separate structures. One end of the first lead screw part 4210 in the longitudinal direction and one end of the second lead screw part 4220 in the longitudinal direction may be connected through a pin. The present disclosure is not limited thereto, and the first lead screw part 4210 and the second lead screw part 4220 may be connected by screwing or welding. Through this connection, the first lead screw part 4210 and the second lead screw part 4220 can rotate in synchronization. To simplify the structure, the first lead screw part and the second lead screw part may be formed by forming different screws on one lead screw.

The screw lead of the first lead screw part 4210 is formed to be larger than the screw lead of the second lead screw part 4220, or in the number of threads moving per rotation of the lead screw 4200, the number of threads of the first lead screw part 4210 may be greater than that of the second lead screw part 4220. The present disclosure is not limited thereto, and the screw lead of the first lead screw part 4210 may be formed to be larger than the screw lead of the second lead screw part 4220, and the number of threads of the first lead screw part 4210 moving per rotation of the lead screw 4200 may be greater than that of the second lead screw part 4220. Accordingly, the moving speed of the upper tubular column 1000 can be higher than the moving speed of the middle tubular column 2000, and the displacement of the upper tubular column 1000 can be greater than the displacement of the middle tubular column 2000.

The telescoping device 4000 is not limited to the above embodiment and may be modified in various manner if the moving speed of the upper tubular column 1000 is higher than the moving speed of the middle tubular column 2000 and the displacement of the upper tubular column 1000 is greater than the displacement of the middle tubular column 2000. For example, the telescoping device 4000 includes a first telescoping device and a second telescoping device, the first telescoping device may include a first motor, a first lead screw, and a first lead screw nut, and the second telescoping device may include a second motor, a second lead screw, and a second lead screw nut. That is, the upper tubular column 1000 and the middle tubular column 2000 may be driven by respective telescoping devices thereof. In this case, if the screw lead of the first lead screw is made larger than the screw lead of the second lead screw and the number of threads of the first lead screw moving per rotation is increased to be greater than the number of threads of the second lead screw moving per rotation, the moving speed of the upper tubular column 1000 becomes higher than the moving speed of the middle tubular column 2000 and the displacement of the upper tubular column 1000 may become greater than the displacement of the middle tubular column 2000.

The moving speed of the upper tubular column 1000 is increased to be higher than the moving speed of the middle tubular column 2000 and the displacement of the upper tubular column 1000 is increased to be greater than the displacement of the middle tubular column 2000 in order to ensure that the upper tubular column 1000 and the middle tubular column 2000 are inserted into the lower tubular column 3000 and complete movement simultaneously when the upper tubular column 1000 and the middle tubular column 2000 move in a direction in which the length of the steering column according to the present disclosure is reduced.

For example, when the number of threads of the first lead screw part 4210 moving per rotation of the lead screw 4200 is 2, the number of threads of the second lead screw part 4220 moving per rotation of the lead screw 4200 is 1, and the first lead screw part 4210 and the second lead screw part 4220 are rotated simultaneously using the motor, the moving speed of the first lead screw nut 4300 screwed to the first lead screw part 4210 is twice the moving speed of the second lead screw nut 4400 screwed to the second lead screw part 4220, and the moving distance of the first lead screw nut 4300 is twice the moving distance of the second lead screw nut 4400.

In addition, when the screw lead of the first lead screw part 4210 is twice the screw lead of the second lead screw part 4220, and the first lead screw part 4210 and the second lead screw part 4210 are rotated simultaneously by the driving motor 4100 simultaneously, the moving speed of the first lead screw nut 4300 screwed to the first lead screw part 4210 is twice the moving speed of the second lead screw nut 4400 screwed to the second lead screw part 4220, and the moving distance of the first lead screw nut 4300 is twice the moving distance of the second lead screw nut 4400.

In the present disclosure, it is desirable that the moving distance of the first lead screw nut 4300 be twice the moving distance of the second lead screw nut 4400. However, the present disclosure is not limited thereto, and when the lead screw 4200 rotates once, the moving distance of the first lead screw nut 4300 may be more than twice the moving distance of the second lead screw nut 4400. The moving distance of the first lead screw nut 4300 may be at least one time (more than one time) and not more than twice the moving distance of the second lead screw nut 4400.

Additionally, in the present disclosure, the outer diameter of the first lead screw part 4210 may be greater than the outer diameter of the second lead screw part 4220, and the first lead screw nut 4300 may be a long cylindrical nut. The second lead screw nut 4400 may be a long cylindrical nut or a general block-shaped nut. The first lead screw nut may also be a block-shaped nut rather than a long cylindrical nut.

When the upper tubular column 1000 is completely overlapped into the lower tubular column 3000, the first lead screw nut 4300 moves to the second lead screw part 4220. In a case where the outer diameter of the first lead screw part 4210 is greater than the outer diameter of the second lead screw part 4220, when the first lead screw nut 4300 moves to the second lead screw part 4220, the first lead screw nut 4300 overlaps the second lead screw part 4220 having a distance from the second lead screw part 4220, and thus the first lead screw nut 4300 is not caught by the second lead screw part 4220 or does not collide with the second lead screw part 4220. When the smooth sliding of the first lead screw nut 4300 is not interrupted in this manner, smooth sliding of the upper tubular column 1000 and the middle tubular column 2000 can be achieved. Since the first lead screw nut 4300 is formed as a long cylindrical nut, the first lead screw part 4210 contacts with a large contact surface, and thus driving can be smoother.

A method of assembling the telescoping device 4000 will be described below.

First, the upper tubular column 1000 is inserted into the middle tubular column 2000 and then the middle tubular column 2000 is inserted into the lower tubular column 3000 such that the upper tubular column long hole 1100, the middle tubular column long hole 2100, and the lower tubular column long hole 3100 are aligned to overlap. Here, the connection portion 4511 of the upper tubular column connection member 4510 mounted on the inner wall of the upper tubular column 1000 is exposed from the lower tubular column long hole 3100 and the connection portion 4611 of the middle tubular column connection member 4610 mounted on the inner wall of the middle tubular column 2000 also exposed from the lower tubular column long hole 3100.

Next, the first lead screw nut connection member 4520 mounted on the first lead screw nut 4300 is connected to the connection portion 4511 of the upper tubular column connection member 4510, and the second lead screw nut connection member 4620 mounted on the second lead screw nut 4400 is connected to the middle tubular column connection member 4610.

Next, the first lead screw part 4210 is screwed to the first lead screw nut 4300, the second lead screw part 4220 is screwed to the second lead screw nut 4400, and an end of the first lead screw part 4210 is connected to an end of the second lead screw part 4220 using a pin, thereby completing connection of the lead screw and the lead screw nut.

Finally, the end of the second lead screw part 4220 opposite the end thereof connected to the first lead screw part 4210 is connected to the output shaft of the motor fixed to the lower tubular column 3000, thereby completing assembly of the telescoping device 4000.

Meanwhile, the structure of the telescoping device 4000 is not limited to the above embodiment and may be implemented differently, and the assembly method may also be implemented differently.

The operation process of the telescoping device 4000 will be described below.

Figure 4:
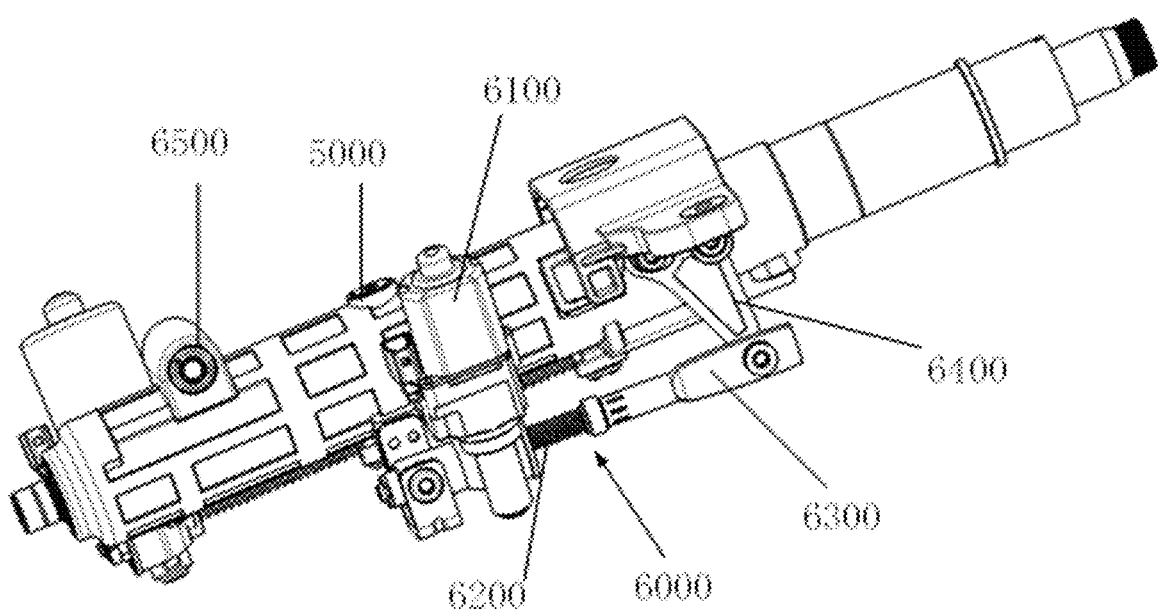
FIG. 4 is a second exemplary perspective view of the vehicle steering column according to the present disclosure.

As illustrated in FIG. 3 to FIG. 5, when the vehicle steering column needs to be expanded or contracted and thus the driving motor 4100 is operated, the lead screw 4200 rotates due to rotation of the output shaft of the driving motor 4100. The first lead screw part 4210 and the second lead screw part 4220 of the lead screw 4200 rotate simultaneously in the same direction, and the first lead screw nut 4300 and the second lead screw nut 4400 move simultaneously. As described above, the first lead screw nut 4300 moves at a higher moving speed and a greater displacement than the second lead screw nut 4400, and thus the upper tubular column 1000 moves faster than the middle tubular column 2000 and a large displacement can be finally obtained. In particular, a large displacement can be obtained in the direction in which the length of the vehicle steering column is reduced.

As illustrated in FIG. 3 to FIG. 5 and FIG. 8, in the structure in which the upper tubular column 1000 is inserted into the middle tubular column 2000 and the middle tubular column 2000 is inserted into the lower tubular column 3000, a stop member 5000 is mounted on the tube wall of the middle tubular column 2000 and the tube wall of the lower tubular column 3000. The stop member 5000 is provided to stop relative movement between a tubular column inserted into another tubular column and the tubular column receiving the tubular column.

Figure 8:
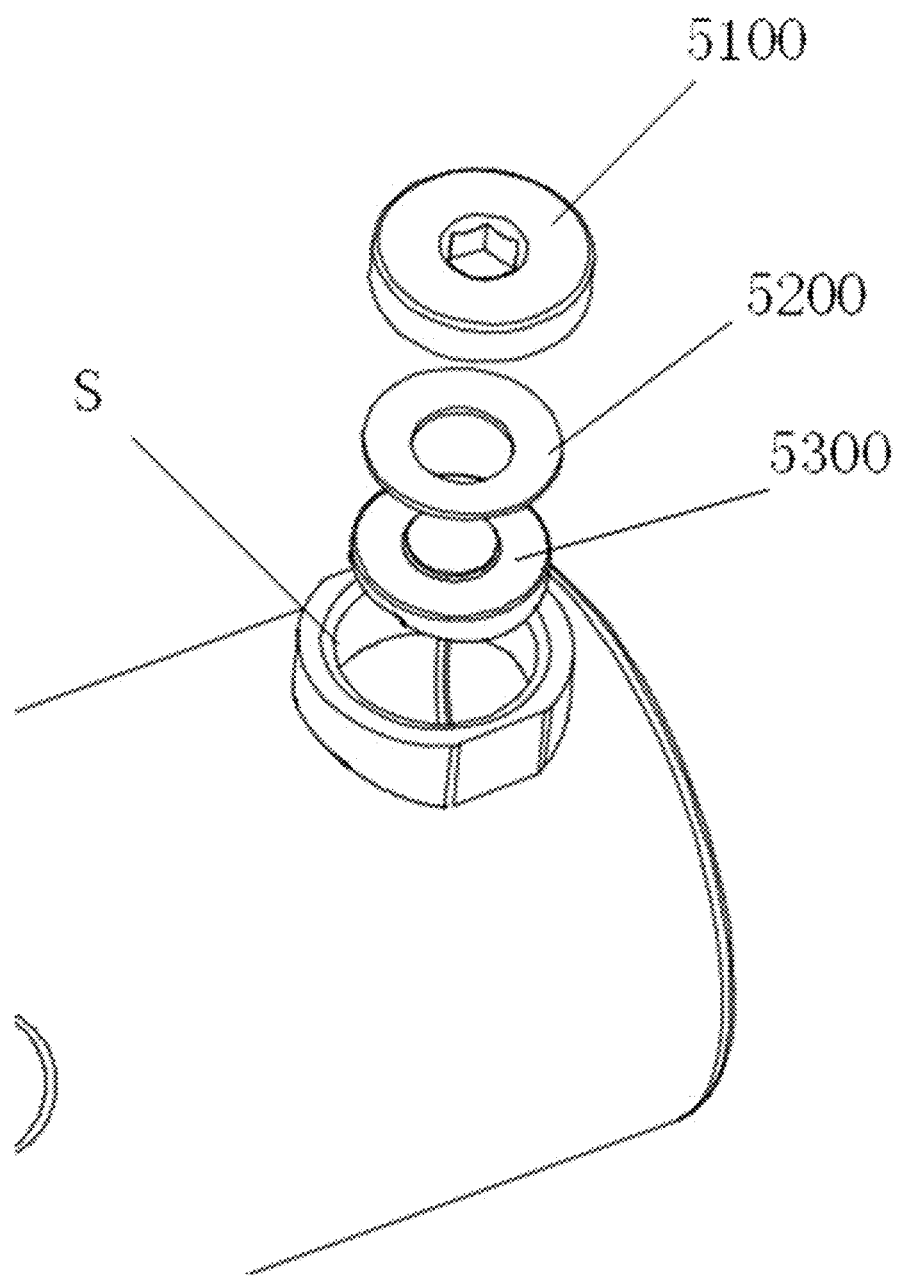
FIG. 8 is an exploded perspective view of a stop member shown in FIG. 3 to FIG. 6.
Figure 9:
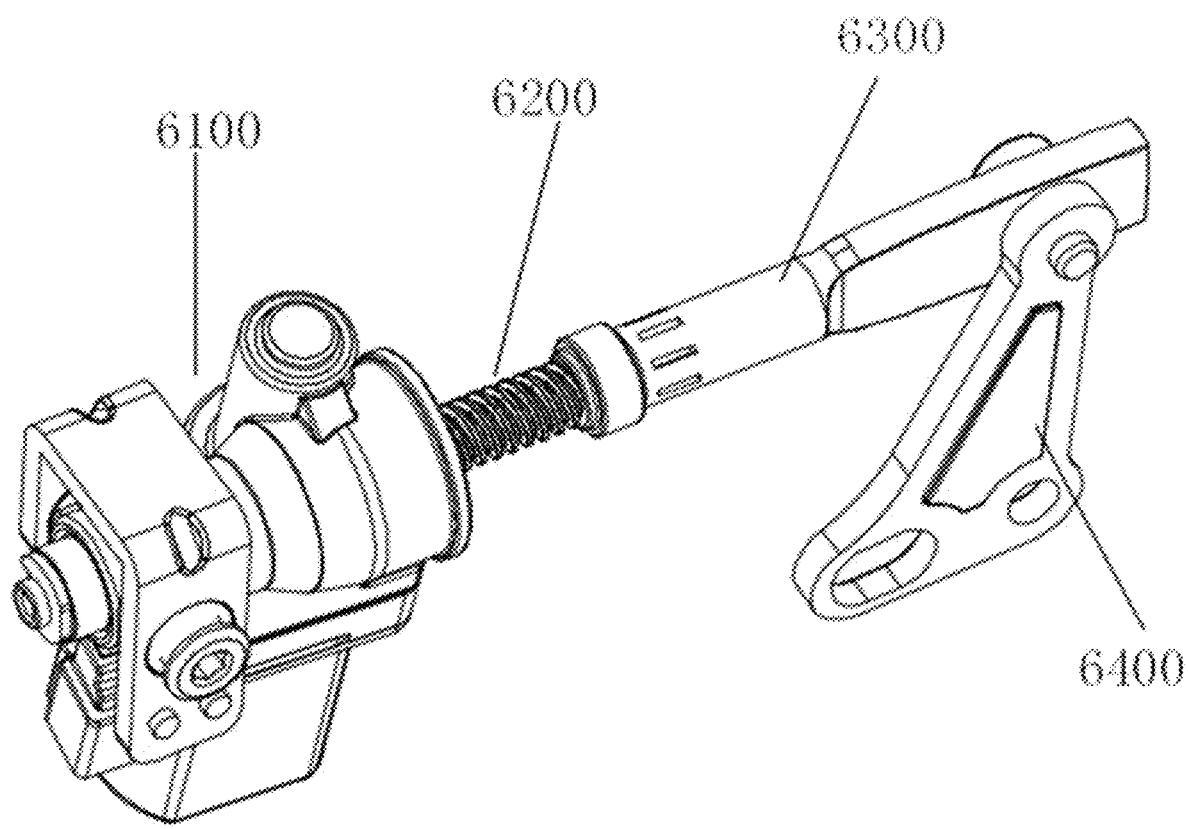
FIG. 9 is a perspective view of a tilting adjustment device shown in FIG. 3 to FIG. 5.

As illustrated in FIG. 8, the stop member 5000 includes a stop bolt 5100, a disc spring 5200, and a bushing 5300 that are sequentially connected. The stop member 5000 is mounted on a through hole S formed in the tube wall of a tubular column, and the bushing 5300 is in close contact with another tubular column located within the tube wall. Additionally, the contact surface of the bushing 5300 that comes into close contact with another tubular column located within the tube wall may be formed as a curved surface that matches the curvature of the outer circumferential surface of the other tubular column.

The stop member 5000 can be used to eliminate the gap between two overlapping tubular columns, thereby ensuring a fixed state between the tubular columns. In addition, the stop member 5000 includes the stop bolt 5100, the disc spring 5200, and the bushing 5300 that are sequentially connected, and the torque of the stop bolt 5100 is adjusted through matching of the stop bolt 5100 and the disc spring 5200, and thus the sliding friction between the tubular columns can be adjusted.

Additionally, as described above, the contact surface of the bushing 5300 that contacts another tubular column located within the tube wall is formed as a curved surface that matches the curvature of the outer circumferential surface of the other tubular column. Accordingly, the bushing 5300 can contact the outer circumferential surface of the tubular column over a large area, thereby improving the fixed support between the tubular columns. That is, the fixed state between the tubular columns can be stably maintained.

Meanwhile, as illustrated in FIG. 3 to FIG. 5 and FIG. 9, the vehicle steering column according to the present disclosure may further include a tilting adjustment device 6000 including a motor 6100, a tilting adjustment lead screw 6200, a lead screw nut 6300, a connection bracket 6400, and an adjustment rotation shaft 6500. The tilting adjustment device 6000 can adjust tilting of the vehicle steering column and the steering wheel according to the present disclosure by adjusting tilting of the lower tubular column 3000 with respect to the vehicle body.

The motor 6100 is connected to the center of the outer wall of the lower tubular column 3000 through a connection member. The connection bracket 6400 is rotatably connected to one end of the outer wall of the lower tubular column 3000 closer to the upper tubular column 1000. The adjustment rotation shaft 6500 is connected to an end of the outer wall of the lower tubular column 3000 away from the upper tubular column 1000. The axis of the adjustment rotation shaft 6500 is perpendicular to the axis of the lower tubular column 3000, the output shaft of the motor 6100 is connected to one end of the tilting adjustment lead screw 6200, the other end of the tilting adjustment lead screw 6200 is connected to one end of the lead screw nut 6300, and the other end of the lead screw nut 6300 is connected to the connection bracket 6400 in a manner that allows relative rotation. The vehicle steering column according to the present disclosure is rotatably mounted on the vehicle body through the adjustment rotation shaft 6500.

The operation of the tilting adjustment device 6000 configured as described above will be described below.

When the motor 6100 is operated since tilting of the vehicle steering column needs to be adjusted, the output shaft of the motor 6100 rotates and the rotational force is transmitted to the tilting adjustment lead screw 6200, causing the tilting adjustment lead screw 6200 to rotate. In this process, the lead screw nut 6300 moves in the longitudinal direction of the tilting adjustment lead screw 6200.

Since the connection bracket 6400 and the lead screw nut 6300, and the lower tubular column 3000 and the connection bracket 6400 are relatively rotatably connected, the vehicle steering column rotates around the adjustment rotation shaft 6500 and tilting adjustment, that is, angle adjustment, is achieved when the lead screw nut 6300 moves.

In this manner, not only the expansion/contraction length but also the tilting angle of the vehicle steering column according to the present disclosure can be adjusted, and thus the position of the steering wheel can be adjusted based on the height and body type of the driver.

In addition, the present disclosure further provides a method of controlling the vehicle steering column by which the length of the vehicle steering column can be variably controlled by controlling the operation of the telescoping device 4000 such that three tubular columns overlap or unfold, and tilting of the vehicle steering column and steering wheel can be adjusted by controlling the operation of the tilting adjustment device 6000. According to the method of controlling the vehicle steering column according to the present disclosure, the moving speed and displacement of the upper tubular column 1000 can be controlled to be greater than the moving speed and displacement of the middle tubular column 2000. The length adjustment process using the telescoping device 4000 and the tilting adjustment process using the tilting adjustment device 6000 has been described in detail above.

Additionally, the present disclosure further provides a vehicle having a steering wheel and a vehicle steering column. The steering wheel is provided in front of the driver inside the vehicle. The vehicle steering column is connected to the steering wheel and the vehicle body and includes three tubular columns overlapping in three stages, and the overall length of the vehicle steering column is varied by overlapping or unfolding the three tubular columns using the telescoping device 4000.

According to the vehicle equipped with the vehicle steering column according to the present disclosure, the vehicle steering column can achieve an expansion displacement of about 30 mm and a contraction displacement of about 170 mm according to one embodiment. In particular, the vehicle steering column according to the present disclosure can have a contraction displacement of about 170 mm, which is greater than a contraction displacement of about 30 mm of the existing vehicle steering column. Accordingly, when the vehicle switches from the driver driving mode to the autonomous driving mode, the steering wheel can be effectively retracted into the vehicle body. Therefore, in the autonomous driving mode, a wide space that can be utilized by the driver inside the vehicle can be secured.

As described above, the vehicle steering column, the control method thereof, and the vehicle according to a preferred embodiment of the present disclosure have been described in detail with reference to the accompanying drawings, but the present disclosure is not limited to the above-described embodiment and can be modified in various manners within the scope of the claims.

What is claimed is:

1. A vehicle steering column, comprising:
   an upper tubular column connectable to a steering wheel;
   a middle tubular column into which the upper tubular column is slidably inserted;
   a lower tubular column into which the middle tubular column is slidably inserted, the lower tubular column being connectable to a vehicle body; and
   a telescoping device connected to the upper tubular column, the middle tubular column, and the lower tubular column to retract or expand the upper, middle and lower tubular columns,
   wherein the telescoping device comprises:
      a driving motor fixed to the lower tubular column;
      a lead screw connected to an output shaft of the driving motor;
      a first lead screw nut engaged with the lead screw and connected to the upper tubular column; and
      a second lead screw nut engaged with the lead screw and connected to the middle tubular column, and
   wherein
      a long hole is respectively formed in each circumferential wall of the upper, middle and lower tubular columns in each longitudinal direction of the upper, middle and lower tubular columns,
      the long holes overlap in whole or in part, and
      the telescoping device is connected to the upper, middle and lower tubular columns through the long holes.

2. The vehicle steering column of claim 1, wherein the upper tubular column and the middle tubular column are configured to simultaneously slide by operation of the telescoping device in a state in which the lower tubular column is stopped.

3. The vehicle steering column of claim 2, wherein, during a simultaneous sliding movement of the upper tubular column and the middle tubular column by the operation of the telescoping device, the upper tubular column is configured to have a moving speed higher than a moving speed of the middle tubular column, and a displacement amount greater than a displacement amount of the middle tubular column.

4. The vehicle steering column of claim 1, wherein
   the lead screw includes a first lead screw part and a second lead screw part, and
   the first lead screw part is engaged with the first lead screw nut, and the second lead screw part is engaged with the second lead screw nut.

5. The vehicle steering column of claim 4, wherein a screw lead of the first lead screw part is larger than a screw lead of the second lead screw part.

6. The vehicle steering column of claim 4, wherein a number of threads of the first lead screw part movable per rotation of the lead screw is greater than a number of threads of the second lead screw part movable per rotation of the lead screw.

7. The vehicle steering column of claim 4, wherein an outer diameter of the first lead screw part is greater than an outer diameter of the second lead screw part, and the first lead screw nut is an elongated cylindrical nut.

8. The vehicle steering column of claim 4, wherein the first lead screw part and the second lead screw part have separate structures, and one end of the first lead screw part in a longitudinal direction of the lead screw and one end of the second lead screw part in the longitudinal direction of the lead screw are connected by a pin, screwing or welding.

9. The vehicle steering column of claim 1, further comprising a stop member, wherein
   the stop member is mounted on the lower tubular column to secure the middle tubular column to the lower tubular column, or
   the stop member is mounted on the middle tubular column to secure the upper tubular column to the middle tubular column.

10. The vehicle steering column of claim 9, wherein the stop member includes a stop bolt, a disc spring, and a bushing sequentially connected, and
   the stop member is mounted in a hole formed in the lower tubular column, the bushing being in contact with an outer circumferential surface of the middle tubular column, or
   the stop member is mounted in a hole formed in the middle tubular column, the bushing being in contact with an outer circumferential surface of the upper tubular column.

11. The vehicle steering column of claim 10, wherein a contact surface of the bushing in contact with the outer circumferential surface of the middle tubular column or the upper tubular column is a curved surface matching a curvature of the outer circumferential surface of the middle tubular column or the upper tubular column.

12. The vehicle steering column of claim 1, further comprising a tilting adjustment device mountable on the vehicle body, the tilting adjustment device mounted on the lower tubular column and configured to adjust tilting of the lower tubular column.

13. The vehicle steering column of claim 12, wherein the tilting adjustment device includes a motor, a tilting adjustment lead screw, a lead screw nut, a connection bracket, and an adjustment rotation shaft.

14. The vehicle steering column of claim 13, wherein
the connection bracket is rotatably connected to one end of an outer wall of the lower tubular column closer to the upper tubular column,
the adjustment rotation shaft is connected to another end of the outer wall of the lower tubular column away from the upper tubular column, and is rotatably mountable on the vehicle body,
an axis of the adjustment rotation shaft is perpendicular to an axis of the lower tubular column,
an output shaft of the motor is connected to one end of the tilting adjustment lead screw,
another end of the tilting adjustment lead screw is connected to one end of the lead screw nut,
another end of the lead screw nut is relatively rotatably connected to the connection bracket, and
the connection bracket is rotatably connected to the lower tubular column.

15. A method of controlling a vehicle steering column, the method comprising:
controlling operation of a telescoping device to cause three tubular columns of the vehicle steering column, which three tubular columns overlap in three stages, to retract or expand to variably adjust a length of the vehicle steering column,
wherein the three tubular columns include a lower tubular column, a middle tubular column, and an upper tubular column,
wherein the telescoping device comprises:
a driving motor fixed to the lower tubular column;
a lead screw connected to an output shaft of the driving motor;
a first lead screw nut engaged with the lead screw and connected to the upper tubular column; and
a second lead screw nut engaged with the lead screw and connected to the middle tubular column, and
wherein
a long hole is respectively formed in each circumferential wall of the three tubular columns in each longitudinal direction of the three tubular columns,
the long holes overlap in whole or in part, and
the telescoping device is connected to the three tubular columns through the long holes.

16. The method of claim 15, wherein the three tubular columns comprise:
a lower tubular column,
a middle tubular column slidably inserted into the lower tubular column, and
an upper tubular column slidably inserted into the middle tubular column, and
in response to the operation of the telescoping device, a moving speed and a displacement amount of the upper tubular column are controlled to be greater than a moving speed and a displacement amount of the middle tubular column.

17. A vehicle, comprising:
a vehicle body;
a steering wheel; and
a vehicle steering column connected to the steering wheel and the vehicle body and including:
three tubular columns overlapping in three stages, and
a telescoping device configured to drive the three tubular columns to retract or expand to vary an overall length of the vehicle steering column,
wherein the three tubular columns include a lower tubular column, a middle tubular column, and an upper tubular column,
wherein the telescoping device comprises:
a driving motor fixed to the lower tubular column;
a lead screw connected to an output shaft of the driving motor;
a first lead screw nut engaged with the lead screw and connected to the upper tubular column; and
a second lead screw nut engaged with the lead screw and connected to the middle tubular column, and
wherein
a long hole is respectively formed in each circumferential wall of the three tubular columns in each longitudinal direction of the three tubular columns,
the long holes overlap in whole or in part, and
the telescoping device is connected to the three tubular columns through the long holes.

18. The vehicle of claim 17, wherein the three tubular columns comprise:
an upper tubular column connected to the steering wheel;
a middle tubular column into which the upper tubular column is slidably inserted;
a lower tubular column into which the middle tubular column is slidably inserted, the lower tubular column being connected to the vehicle body; and
the telescoping device is connected to the upper tubular column, the middle tubular column, and the lower tubular column, and is configured to drive the three tubular columns such that a moving speed and a displacement amount of the upper tubular column are greater than a moving speed and a displacement amount of the middle tubular column.

19. The vehicle of claim 18, wherein the vehicle steering column further includes a tilting adjustment device mounted on the vehicle body and the lower tubular column to adjust tilting of the lower tubular column with respect to the vehicle body.

* * * * *